(12) United States Patent
Bastyr et al.

(10) Patent No.: US 11,437,015 B2
(45) Date of Patent: Sep. 6, 2022

(54) SYSTEM AND METHOD FOR ADAPTIVE MAGNITUDE VEHICLE SOUND SYNTHESIS

(71) Applicant: HARMAN INTERNATIONAL INDUSTRIES, INCORPORATED, Stamford, CT (US)

(72) Inventors: Kevin J. Bastyr, Franklin, MI (US); Divya Sishtla Venkata, Novi, MI (US); David Paul Trumpy, Novi, MI (US)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 0 days.

(21) Appl. No.: 17/251,421

(22) PCT Filed: Jun. 12, 2018

(86) PCT No.: PCT/US2018/037042
§ 371 (c)(1),
(2) Date: Dec. 11, 2020

(87) PCT Pub. No.: WO2019/240768
PCT Pub. Date: Dec. 19, 2019

(65) Prior Publication Data
US 2021/0118421 A1    Apr. 22, 2021

(51) Int. Cl.
*G10K 15/02* (2006.01)
*G10L 21/0272* (2013.01)
(Continued)

(52) U.S. Cl.
CPC .......... *G10K 15/02* (2013.01); *G10L 21/0272* (2013.01); *G10L 25/51* (2013.01);
(Continued)

(58) Field of Classification Search
CPC ..... G10K 15/02; G10L 21/0272; G10L 25/51; G10L 25/84; H04R 1/025; H04R 1/08;
(Continued)

(56) References Cited

U.S. PATENT DOCUMENTS 5,615,270 A     3/1997  Miller et al.
5,635,903 A  *  6/1997  Koike ................... B60Q 5/008
                                                340/384.1
(Continued)

FOREIGN PATENT DOCUMENTS

CN      104661143 A    5/2015
EP        2874147 A2   5/2015
WO    2019231452 A1   12/2019

OTHER PUBLICATIONS

International Search Report and Written Opinion of PCT/US2018/037042 dated Mar. 8, 2019, 19 pages.
(Continued)

*Primary Examiner* — William A Jerez Lora
(74) *Attorney, Agent, or Firm* — Brooks Kushman P.C.

(57) ABSTRACT

A vehicle sound synthesis system is provided with a loudspeaker, a microphone and a controller. The loudspeaker is adapted to project sound indicative of synthesized engine noise (SEN) within a cabin of a vehicle in response to receiving an adjusted SEN signal. The microphone is disposed in the cabin and adapted to provide a microphone signal having a SEN component and a noise component. The controller is programmed to receive the microphone signal, adjust a SEN signal based on the microphone signal, and provide the adjusted SEN signal to the loudspeaker.

18 Claims, 4 Drawing Sheets

(51) Int. Cl.
  *G10L 25/51* (2013.01)
  *G10L 25/84* (2013.01)
  *H04R 1/02* (2006.01)
  *H04R 1/08* (2006.01)
  *H04R 3/00* (2006.01)

(52) U.S. Cl.
  CPC ............. *G10L 25/84* (2013.01); *H04R 1/025* (2013.01); *H04R 1/08* (2013.01); *H04R 3/00* (2013.01); *H04R 2430/01* (2013.01); *H04R 2499/13* (2013.01)

(58) Field of Classification Search
  CPC ... H04R 3/00; H04R 2430/01; H04R 2499/13
  USPC .............. 381/56, 57, 58, 71.1, 71.4, 86, 389
  See application file for complete search history.

(56) References Cited

U.S. PATENT DOCUMENTS

| | | | |
|---|---|---|---|
| 6,748,086 B1* | 6/2004 | Venkatesh | H04R 3/02 381/86 |
| 8,838,445 B1* | 9/2014 | Bultemeier | G11B 20/22 704/226 |
| 9,324,314 B2 | 4/2016 | Park et al. | |
| 9,893,699 B2 | 2/2018 | Zollner | |
| 2006/0098827 A1* | 5/2006 | Paddock | H03G 9/005 381/106 |
| 2006/0269078 A1* | 11/2006 | Sakamoto | G10K 11/1783 381/71.1 |
| 2011/0218711 A1* | 9/2011 | Mathur | H04N 7/18 701/532 |
| 2012/0062391 A1 | 3/2012 | Pan | |
| 2012/0101611 A1* | 4/2012 | Inoue | G10K 15/02 700/94 |
| 2012/0257763 A1 | 10/2012 | Bowden et al. | |
| 2013/0304459 A1* | 11/2013 | Pontoppidan | H03G 3/00 381/104 |
| 2014/0056438 A1 | 2/2014 | Baalu et al. | |
| 2015/0139442 A1 | 5/2015 | Kreifeldt et al. | |
| 2015/0197195 A1 | 7/2015 | Hera et al. | |
| 2016/0029119 A1 | 1/2016 | Valer et al. | |
| 2016/0284334 A1* | 9/2016 | Hera | G10K 15/02 |
| 2017/0092289 A1* | 3/2017 | Suzuki | G10L 15/26 |
| 2017/0140771 A1* | 5/2017 | Taniguchi | G10L 15/05 |

OTHER PUBLICATIONS

Supplementary European Search Report of European application No. EP18922247 dated Dec. 17, 2021, 9 pages.

* cited by examiner

SYSTEM AND METHOD FOR ADAPTIVE MAGNITUDE VEHICLE SOUND SYNTHESIS

CROSS-REFERENCE TO RELATED APPLICATION

This application is the U.S. national phase of PCT Application No. PCT/US2018/037042 filed on Jun. 12, 2018, the disclosure of which is incorporated in its entirety by reference herein.

TECHNICAL FIELD

One or more embodiments relate to a vehicle system and method for synthesizing sound during background noise conditions.

BACKGROUND

Vehicles include components that generate noise that is typically audible to a driver and any passengers within the passenger compartment. For example, a driver may hear noise generated by an engine of a powertrain, and an exhaust system of the vehicle. Such noise may be reduced or absent in new vehicle architectures and driving modes. For example, an electric vehicle does not include an internal combustion engine, and therefore does not generate typical engine noise. The absence of engine noise may be unexpected for a driver. Therefore, a vehicle audio system may generate synthetic noise that represents typical or expected noise generated while operating the vehicle.

SUMMARY

In one or more embodiments, a vehicle sound synthesis system is provided with a loudspeaker, a microphone and a controller. The loudspeaker is adapted to project sound indicative of synthesized engine noise (SEN) within a cabin of a vehicle in response to receiving an adjusted SEN signal. The microphone is disposed in the cabin and adapted to provide a microphone signal having a SEN component and a noise component. The controller is programmed to receive the microphone signal, adjust a SEN signal based on the microphone signal, and provide the adjusted SEN signal to the loudspeaker.

In one or more embodiments, a vehicle system is provided with a controller configured to receive a microphone signal from a microphone that corresponds to sound and noise present within a vehicle cabin and process the microphone signal. The controller is further configured to generate a SEN signal indicative of synthesized engine noise (SEN), adjust the SEN signal based on the processed microphone signal; and provide the adjusted SEN signal to a loudspeaker for projecting as the sound present within the vehicle cabin.

In one or more embodiments, a computer-program product embodied in a non-transitory computer readable medium that is programmed for synthesizing engine noise (SEN) is provided. The computer-program product comprises instructions for: receiving a microphone signal indicative of sound and noise present within a vehicle cabin, and input indicative of a vehicle speed; and processing the microphone signal. The computer-program product further comprises instructions for: generating a SEN signal indicative of SEN based on the vehicle speed; adjusting the SEN signal based on the processed microphone signal; and providing the adjusted SEN signal to a loudspeaker for projecting the sound within the vehicle cabin.

DETAILED DESCRIPTION

As required, detailed embodiments are disclosed herein; however, it is to be understood that the disclosed embodiments are merely exemplary and may be embodied in various and alternative forms. The figures are not necessarily to scale; some features may be exaggerated or minimized to show details of particular components. In addition, flow charts are shown that contain a number of steps, and the steps are possible to execute in alternate orders, and in some embodiments, multiple steps are happening concurrently. Therefore, specific structural and functional details disclosed herein are not to be interpreted as limiting, but merely as a representative basis for teaching one skilled in the art.

Figure 1:
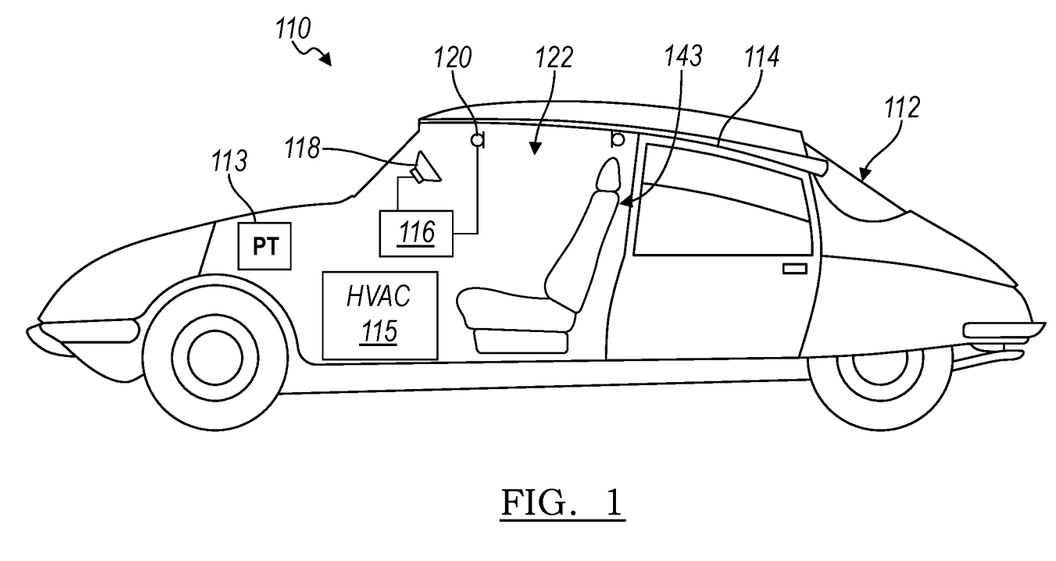
FIG. 1 is a schematic diagram of a vehicle system for synthesizing sound relative to background noise conditions according to one or more embodiments.

With reference to FIG. 1, a vehicle system for synthesizing sound is illustrated in accordance with one or more embodiments and generally represented by numeral 110. The vehicle system 110 is depicted within a vehicle 112. The vehicle 112 includes a powertrain 113, which may include an internal combustion engine (ICE). The vehicle 112 includes one or more windows 114, and a heating, ventilation and air conditioning (HVAC) system 115 for controlling the climate within the vehicle. The vehicle system 110 includes a controller 116, at least one loudspeaker 118, and in certain embodiments, at least one microphone 120.

A driver may expect to hear noise from the powertrain 113 within an interior cabin or passenger compartment 122 of the vehicle 112 during certain driving modes or maneuvers. Such powertrain noise may be reduced or absent in new vehicle architectures and driving modes. The controller 116 communicates with one or more vehicle controllers (not shown) to monitor various vehicle components and systems, such as the powertrain 113 under current driving conditions. The controller 116 generates a synthesized engine noise (SEN) signal that aides the driving experience by providing audible feedback of the vehicle's driving dynamics (e.g., acceleration, cruising, deceleration, reverse, startup, shutdown), which is provided to the loudspeaker 118 and projected as SEN that is audible within the passenger compartment 122. This SEN combines with the actual engine sound to produce the total engine sound heard by the driver. This total engine sound combines with background noise in the passenger compartment to form the soundscape experienced by the driver.

The sound level of the background noise may vary based on numerous factors, such as music and climate control settings (e.g., the state of the windows 114, defrost mode, and/or HVAC fan speed). Therefore, the controller 116 adjusts or increases the SEN signal in response to an increasing background noise level, e.g., by increasing the level according to one or more methods as described below. The SEN term as used herein may refer to audible airborne sound, and to an electrical signal that is sent to an amplifier and then to a speaker to become the audible sound. In one or more embodiments, the SEN may include synthesized vehicle sound that represents engine turn on and turn off conditions.

Figure 2:
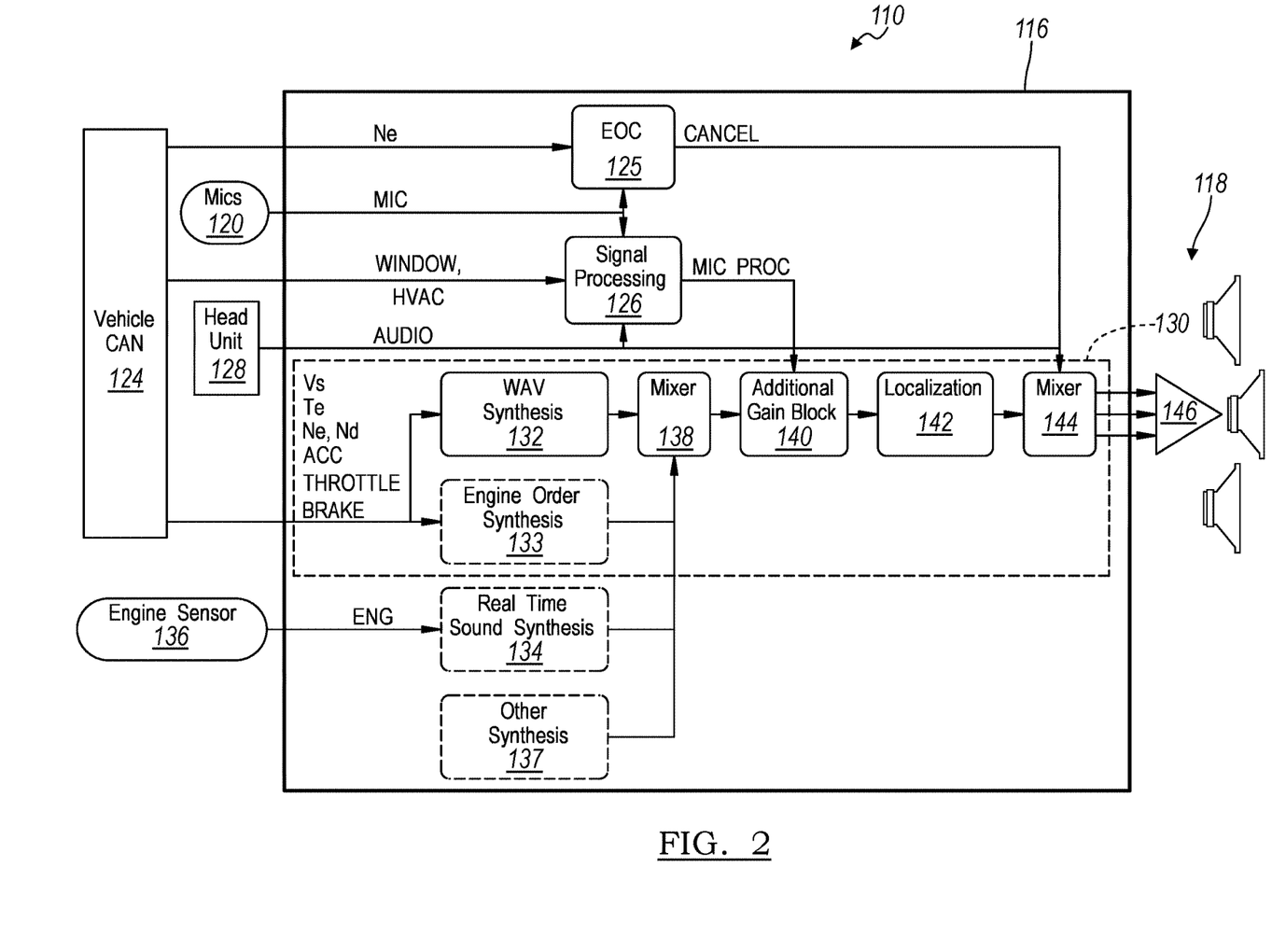
FIG. 2 is a schematic block diagram of the vehicle system of FIG. 1.

Referring to FIGS. 1-2, the controller 116 communicates with other vehicle systems and controllers via one or more vehicle networks by wired or wireless communication. The vehicle network may include a plurality of channels for communication. One channel of the vehicle network may be a serial bus such as a Controller Area Network (CAN) 124. One of the channels of the vehicle network may include an Ethernet network defined by Institute of Electrical and Electronics Engineers (IEEE) 802 family of standards. Additional channels of the vehicle network may include discrete connections between modules and may include power signals. Different signals may be transferred over different channels of the vehicle network. For example, video signals may be transferred over a high-speed channel (e.g., Ethernet) while guiding signals may be transferred over CAN or discrete signals. The vehicle network may include any hardware and software components that aid in transferring signals and data between modules and controllers.

Although the controller 116 is shown as a single controller, it may contain multiple controllers, or it may be embodied as software code within one or more other controllers. The controller 116 generally includes any number of microprocessors, ASICs, ICs, memory (e.g., FLASH, ROM, RAM, EPROM and/or EEPROM) and software code to co-act with one another to perform a series of operations. The controller 116 includes predetermined data, or "look up tables" that are stored within the memory, according to one or more embodiments.

The controller 116 includes an Engine Order Cancellation (EOC) module 125 according to one or more embodiments. The EOC module 125 cancels, or reduces engine sound. The controller 116 receives one or more microphone signals, (MIC) that represents sound measured within the passenger compartment 122. The sound in the passenger compartment 122 may include SEN, speech, music, etc., therefore the microphone signal (MIC) includes components associated with each sound, e.g., a SEN component, speech component, music component, etc. In one or more embodiments, the vehicle 112 includes four microphones 120 that are mounted at different locations within the passenger compartment 122, and the controller 116 receives four corresponding MIC signals. The controller 116 also receives signals that represent the rotational speed of the engine (Ne) and the rotational speed of the drive shaft (Nd). Using these signals (MIC, and Ne or Nd), the EOC module 125 generates a signal (CANCEL) to cancel or reduce specific engine orders, as perceived at specific locations within the passenger compartment 122, e.g., near the ears of the driver.

The controller 116 also includes a signal processing module 126 that determines a SEN gain in order to achieve audible, but not excessively loud SEN in the passenger compartment 122, based on the MIC signal, and signals that represent the present climate control and audio system settings. The controller 116 receives a WINDOW signal that represents the current setting or state of one or more of the windows 114 in the vehicle (e.g., partially open, fully open, or closed). The controller 116 also receives an HVAC signal that represents the current settings of the HVAC system 115 (e.g., defrost on/off, and fan speed, etc.) The controller 116 also receives an AUDIO signal that represents the music playing in the passenger compartment 122, or in some embodiments, the volume and genre, and equilibrium, and fade. The music genre setting may set the average level and crest factor of the music, and a four-channel volume setting, the balance and fade knobs. In one or more embodiments, the AUDIO signal may be single or split band analyzed to determine its effective signal amplitude or energy in each frequency band and the volume knob setting may be used as an additional guiding signal to determine the SEN playback level or desired set frequency dependent filtering. Using these signals (MIC, WINDOW, HVAC, AUDIO), the signal processing module 126 generates a frequency dependent, or independent gain.

The vehicle 112 includes a vehicle audio system that includes the controller 116, the loudspeaker(s) 118, the microphones 120, and a head unit 128. The controller 116 receives the audio signals (AUDIO) from the head unit 128. Like the controller 116, the head unit 128 generally includes any number of microprocessors, ASICs, ICs, memory (e.g., FLASH, ROM, RAM, EPROM and/or EEPROM) and software code to co-act with other controllers to perform a series of operations. The controller 116 includes a SEN module 130 for generating synthetic engine sound or noise. The SEN module 130 receives numerous guiding signals from the CAN bus 124, such as vehicle speed (VS), engine torque (Te), engine speed (Ne), and throttle (THROTTLE) position. The controller 116 illustrated in FIG. 2 receives multiple guiding signals, however alternate embodiments of the vehicle system 110 contemplate the controller 116 receiving fewer, alternate and/or additional guiding signals.

In one or more embodiments, the SEN module 130 includes a WAV Synthesis block 132 that plays back a filtered, modified, or augmented audio bitstream that is generated from a Waveform (WAV) Audio File and represents synthetic engine sound or synthetic engine noise. In one or more embodiments, the WAV Synthesis block 132 generates the audio bitstream. The WAV Synthesis block 132 also includes features for modulating the characteristics of the audio bitstream, e.g., playback rate, frequency dependent filtering, and/or amplitude. In one or more embodiments, the SEN module 130 also includes an Engine Order Synthesis block 133 that generates an engine order signal based on, for example, engine order frequencies and levels found in lookup tables for the engine speed or vehicle speed.

The controller 116 also includes a Real Time Sound Synthesis Module 134 according to one or more embodiments. The Real Time Sound Synthesis Module 134 receives an engine signal (ENG) that represents the current vibroacoustic emissions of the engine. The ENG signal may be derived from a pressure or vibration sensor 136 that is mounted in proximity to the engine and/or emissions system. In an embodiment, the Real Time Sound Synthesis Module 134 processes the ENG signal into individual engine orders that may then be individually filtered, equalized and then provided to a Mixer block 138 to be combined with the output of the WAV Synthesis block 132 and the Engine Order Synthesis block 133. In an alternate embodiment, the ENG signal may be filtered and provided to the Mixer block 138 to create the desired real time SEN characteristics. Other embodiments of the vehicle system 110 contemplate additional and/or alternative synthesis module(s) 137 for synthesizing other sound (e.g., cloud-based sounds, over-the-air (OTA) updated sounds, cloud-based algorithms wired or wirelessly externally connected models, etc.).

The SEN module 130 also includes an Additional Gain Block (AGB) 140 for adjusting, e.g., amplifying or attenuating, the gain based on one or more signals, e.g., CAN based or guiding signals, that represent background noise level as described in detail below with reference to FIGS. 3-6. The gain is expressed using the logarithmic decibel (dB) units. A gain of 1 corresponds to zero dB and represents a pass-through condition where the AGB 140 passes SEN without modification. A gain greater than one (positive dB) refers to amplification, and a gain less than one (negative dB) refers to reduction. In one or more embodiments, the AGB 140 includes multiple Additional Gain Blocks that each address the Gain for a predetermined frequency band.

In some embodiments, the SEN module 130 includes a Localization block 142 that receives the audio signal from the AGB 140 and generates a sound image of where the engine would typically be located relative to the loudspeakers 118. The localization block 142 creates an illusion to the listeners that the synthetic engine sound is emanating from the engine compartment, and not from the loudspeakers 118. For example, in one or more embodiments, the Localization block 142 generates a sound image for the SEN that corresponds to a location three to four feet forward of a loudspeaker 118 located in a headrest of a driver seat 143.

The SEN module 130 includes a Mixer 144 for combining the localized SEN output of the Localization block 142, with the CANCEL and AUDIO signals. The controller 116 provides the combined output signal(s) to one or more power amplifiers 146, which in turn provides amplified SEN signals to the loudspeakers 118. The vehicle system 110 plays the amplified combined output signals through the vehicle loudspeakers 118 to provide the vehicle occupants, especially the driver, real time audible feedback of the vehicle's operating state.

The vehicle system 110 is applicable to vehicles 112 having different powertrains 113. In one or more embodiments, the vehicle 112 is a conventional vehicle with a powertrain 113 that includes a four-cylinder internal combustion engine. Such four-cylinder engines naturally radiate certain engine orders—mainly the 2nd, 4th, 6th, and 8th orders of the engine output shaft rotational speed. The vehicle system 110 synthesizes additional engine orders: 2.5, 4.5, and 6.5 engine orders, e.g., using the Engine Order Synthesis block 133, to add a racier character to the engine's sound signature.

In another embodiment, the vehicle 112 is an auto-start stop vehicle with a powertrain 113 that includes an engine that is controlled to stop or shut-off when the vehicle stops for a short period of time, e.g., at a traffic light, and then restart to provide propulsion. This start/stop technology is employed to increase fuel efficiency. In various embodiments, the vehicle system 110 generates SEN to remove or mask the abrupt audible transition when the engine turns off or restarts using various combinations of the Engine Order Synthesis block 133 and the WAV Synthesis block 132. The level of this SEN set by the AGB 140 is determined by the signal processing module 126 in order to match the sound pressure level, or perceived loudness, of the engine just prior to when it is shut off. This may include matching the level or loudness of one or more individual engine orders. This may include a calculation, performed by signal processing module 126, of the Signal to Noise Ratio (SNR), Sound Pressure Level (SPL), or perceived loudness of one or more individual engine orders and adjusting the AGB 140 to substantially match the SEN level of one or more engine orders after the engine has turned off. This calculation of the SNR, SPL or perceived loudness by the signal processing module 126 may be intermittent, continuous, or may be performed just prior to engine shut off.

In certain embodiments, for both hybrid or auto-start stop ICE vehicles, the engine order synthesis block 133 synthesizes certain harmonics while the ICE is operating, and then when the ICE is shut off, synthesizes one or more additional engine orders to replace those that are no longer being created and radiated by the vehicle's power train 113. In an embodiment, when the ICE is shut off, block 133 generates additional engine orders to closely replicate the sonic signature that the ICE had produced at the location of one or more passenger's ears. This may include matching individual engine orders, and also between order noise or noises. This may include replicating the sonic signature in one or more frequency bands.

In yet another embodiment, the vehicle 112 is a hybrid electric vehicle (HEV) with a powertrain 113 that includes both an engine and an electric motor that be controlled, alone or in combination, to propel the vehicle. The vehicle system 110 generates SEN, using the SEN module 130, when the HEV 112 is operating in electric mode, i.e., the electric motor alone is operated for propulsion in order to provide the audible engine sound signature of a gasoline powered engine that the driver and vehicle occupants may be more accustomed to. This added sound aides the driving experience by providing audible feedback of the vehicles driving dynamics (acceleration, cruising, and deceleration, reverse, startup, shutdown, etc.). Fully electric vehicles, and HEVs operating in EV mode, have an internal soundscape that consists primarily of vehicle suspension noise, vibration and harness (NVH) and electric motor whine, the latter of which is harmonically sparse. Often the sound signature of motor whine is viewed as undesirable, due both to its high frequency nature, and the lack of harmonic complexity. Naturally other sounds are present in the passenger compartment.

In other embodiments, the vehicle system 110 modifies or reduces the audible character of the engine sound signature. In this case, the vehicle system 110 reduces the audible level of the engine and/or electric motor using the engine order cancellation (EOC) module 125. This EOC module 125 reduces the overall level of individual engine orders, and therefore reduces the total level of engine noise in the passenger compartment at the locations of the vehicle occupants. Then, a SEN may be played through the loudspeakers 118, and the original sound at the locations of the passengers' ears may be effectively, then indirectly, replaced, or masked, by that of the SEN. By first dramatically reducing the level of the actual engine noise at the locations of the passengers' ears, the overall sound pressure level including the contribution of the SEN at the location of the passenger's ears is lower than it otherwise would be without employing the EOC system. The presence or absence of an EOC system changes background noise level, and so it requires a different SEN level, therefore it is often desirable to reduce the overall noise in the cabin before the SEN is applied.

As previously mentioned, SEN generation systems coupled with EOC systems have the capability to mask existing engine sound with more desirable synthesized engine-like sounds and or to enhance existing engine sounds to play in the passenger compartment 122 of the vehicle 112. Most of the synthesized engine sounds in these systems are tuned using one or more reference CAN signals such as vehicle speed (VS), throttle (or ACC), engine torque (Te), in order to naturally integrate these sounds into the vehicle. The synthesized engine sound is played at a level that is somewhat subtle, it should not be played so loud that it annoys or fatigues occupants of the vehicle. In some cases, the interior sound pressure level of the passenger cabin is a metric of quality: quieter cabins may be a sign of a luxury vehicle.

In an EV or HEV, the vehicle system 110 synthesizes engine-like sounds, i.e., SEN, and plays it through the loudspeakers 118 to provide a more traditional engine start up and driving vehicle experience. The SEN may be of any sonic character and need not mimic an engine. In one or more embodiments, the SEN resembles sounds that are not typical of an automotive engine, e.g., a jet engine for an aircraft. This SEN may start when the vehicle's power button (not shown) is pressed and helps provide an audible feedback to the driver that the vehicle is powered on. This SEN continues to be played through the loudspeakers 118 to give the driver audible feedback as to the state of the vehicle—whether at idle, accelerating, decelerating, or just cruising.

Often, a goal of creating SEN is to provide the vehicle's driver a form of audible feedback of the vehicle's current operating state. For example, with hybrid vehicles operating in electric mode, or with pure electric vehicles, there is no engine idle sound. That is, the powertrain of the vehicle is completely silent when the wheels are not turning. The driver, therefore, has no audible indication that the vehicle is powered on, even if the transmission is in drive and not park. In the case of vehicle acceleration, the vehicle's driver is accustomed to the amplitude of the engine noise increasing as the vehicle speed increases, as is the behavior of an ICE. To mimic this behavior with SEN, the accelerator pedal position (ACC) and the engine torque (Te) are used, by at least one of the WAV Synthesis block 132 and the Engine Order Synthesis block 133, as guiding signals to increase the amplitude of the synthetic engine sound. Other embodiments of the vehicle system 110 contemplate alternate synthesis blocks. Drivers are also accustomed to the pitch of the engine orders increasing as the vehicle speed increases, as is also the behavior of an ICE. To mimic this behavior, the engine shaft rotational speed (Ne), wheel speed, or vehicle speed (Vs) is used as a guiding signals to the WAV Synthesis block 132 and the Engine Order Synthesis block 133 of the SEN module 130 to adjust the pitch of the synthetic engine orders or SEN.

A simplified SEN system may generate SEN at a level that is proportional to vehicle speed. Such a simplified SEN system may not optimize the SEN playback level based on the background noise level within the passenger compartment. For example, with such a simplified system, the HVAC related fan noise may completely mask the subtle synthetic engine sound. Other noise sources in the passenger compartment include road noise, wind noise, music playback noise, and noise from passengers. The sound level of this noise may increase with increasing vehicle speed. Therefore, a simplified SEN system may use vehicle speed as a guiding signal to influence the SEN playback level. However, such a simplified strategy may not be appropriate for all vehicle conditions. For example, although the road noise level may be directly proportional to vehicle speed on a given pavement type, high vehicle speed on smooth pavement may result in lower or quieter road noise level than lower vehicle speed on rough pavement. Additionally, wind noise is another variable that may be proportional to vehicle speed, as it depends on the wind direction, and often is not steady state. However, if one or more of the vehicle widows is opened, the impact in interior sound pressure level (SPL) may be difficult to predict, and non-uniform for the driver and any passengers. Further, a microphone located in proximity to an open window may be subject to excess wind noise and therefore would not provide a signal that is suitable to predict the in-cabin noise level. Thus, a simplified SEN strategy that includes a single SEN tuning that is proportional to vehicle speed may result in sub-optimal performance.

The background noise in the passenger compartment 122 may be caused by a variety of sources, including: HVAC settings, road noise, wind noise, window state (i.e., open or closed), music noise, and speech. HVAC noise is variable and depends not only on fan speed, but also on modes, such as defrost, recirculate, dual-temperature-zone control, third row fan speed, etc. Road noise is variable and generally proportional to vehicle speed. Wind noise is not steady state (e.g., wind is in gusts) and is dependent on present state. Music noise is variable and depends not only on volume knob settings, but also on music genre (which sets the average level and crest factor of the music), on the balance and fade knobs, and on the selected equalization (EQ). The window state is variable, it may be difficult to predict the background noise impact based on the window state because it depends on which window is open, how far it is open, what the vehicle speed is, if there is any external noise, etc.

CAN based or other guiding signals are available to the signal processing module 126 that may be used in an embodiment to adjust the level of the SEN, without using input from Mics 120. In an embodiment, a predetermined lookup table of gains versus in-cabin noise contributors may be available to signal processing module 126. Such a table may include entries of one or more of audio system volume knob level, HVAC fan speed, HVAC mode, Music Genre, balance and fade knob position, EQ name or shape, window open or closed state, and may even include entries for various pavement types or roughness. The signal processing module 126 may determine a gain to be applied in 140 based on these and other vehicle state variables that may contribute to the in-cabin noise level. In an embodiment, these guiding signals and lookup table approach may also be combined with microphone signal MIC.

The vehicle system 110 determines an optimal playback level of synthetic engine noise based on the instantaneous ambient or background noise level of locations within the passenger compartment 122. The vehicle system 110 also uses one or more guiding signals to determine the SEN playback level.

Another simplified SEN system may adopt a general approach to measure the level of noise in the passenger cabin near the occupant's ears and then adjust the playback level of the SEN to overcome the potential presence of music and/or speech in the passenger compartment. An audio system that automatically adjusts the sound level of music may complicate such a simple SEN system, because if the SEN system increases its playback level based on a background noise level that includes the music, then the music playback system may increase its level based on the increased level of SEN. This creates an unstable system with ever increasing playback levels of both systems, which is undesirable because it is unstable.

In one or more embodiments, the vehicle system 110 removes, as best as possible or practical, all traces of the music signal from the microphone signal (MIC), that is used to estimate the background noise level within the passenger compartment 122 using an electrical or acoustic noise suppression technique. Such a technique may be analogous to an echo canceller system, where an interfering signal is removed from a first signal, to provide a de-noised version of the first signal. An alternate technique is to characterize the transfer function between each music playback loudspeaker 118 and microphone 120. Then, the AUDIO signal sent to an individual speaker may be convolved with that loudspeaker to microphone transfer function, to create a new signal that may be subtracted from each MIC signal using an adaptive algorithm such as a Least Mean Squared (LMS) or other algorithm, thereby producing an estimate of the instantaneous background noise level that is unaffected by the music present in the passenger compartment. Alternately, the vehicle system 110 may use a simple method, such as spectral subtraction, to reduce the music signal level from the MIC signal, producing an estimate of the background noise level that is largely unaffected by the music playback in the passenger compartment 122. Other embodiments of the vehicle system 110 may employ alternate signal processing techniques to remove or reduce the music signal level in the MIC signal. The vehicle system 110, may eliminate this noise suppression step if there is no music playback, in the case of the system turned off or if the volume knob is set to zero, or is set to a level that is suitably masked by the other in-cabin noise sources.

Computationally efficient algorithms will not completely eliminate every trace of the music playback signal on the MIC signal. In such cases, it is possible to use both the MIC signal and also one or more of the above mentioned guiding signals related to the music playback system settings, such as volume knob setting, balance, fade, EQ, music statistics, etc. to guide the determination of the SEN playback level.

The vehicle system 110 repeats this noise suppression technique using the SEN signal itself as the signal to eliminate from the MIC signal, according to one or more embodiments. If the SEN signal is not removed from the MIC signal, the same type of ever increasing amplitude will result, as the SEN will add to the noise level, which would then trigger an increased SEN level, and on and on as the SEN gain would increase to the maximum possible level. The same techniques and caveats apply when employing the transfer function and adaptive LMS system, as the SEN signal to different speakers will differ from each other if a localization algorithm is employed. Other embodiments of the vehicle system 110 contemplate alternate techniques to remove the SEN signal from the MIC signal or signals.

Referring to FIGS. 3-6, the vehicle system 110 includes one or more algorithms or methods for synthesizing sound relative to varying background noise conditions. The vehicle system 110 uses the one or more methods to determine the background noise level in the passenger compartment 122 and then adjusts the level and or the spectral balance of the SEN in an amount to achieve the target level or SNR or Loudness. The net result is that the driver and any passengers perceive little or no apparent SEN level change while the background noise level fluctuates up and down depending on interior noise conditions in the passenger compartment 122. The background noise in a typical vehicle is such that the lowest frequencies of the SEN will be substantially masked, whereas the very highest frequencies will not be substantially masked. Therefore, in one or more embodiments, the vehicle system 110 operates on three or more frequency ranges independently (low, middle and high). The methods are implemented using software code contained within the controller 116 (shown in FIG. 2) according to one or more embodiments. While the methods are described using flowcharts that are illustrated with a number of sequential steps, one or more steps may be omitted and/or executed in another manner, or simultaneously in one or more other embodiments.

Figure 3:
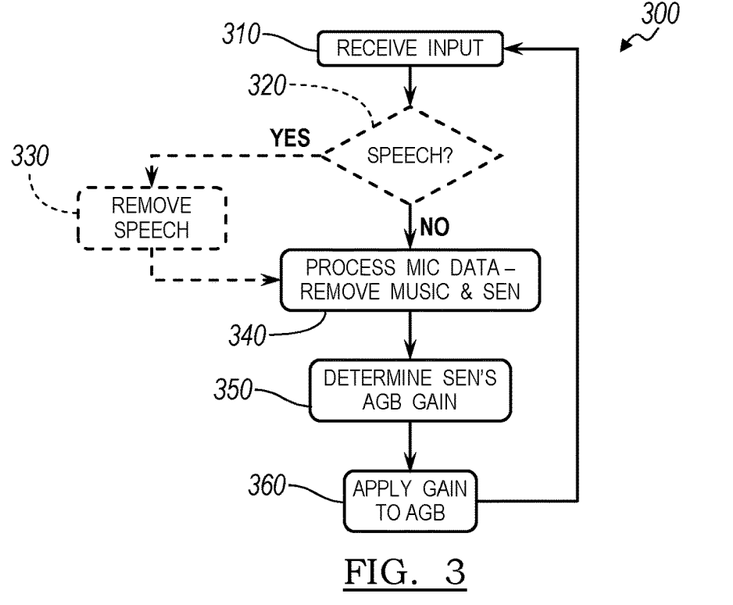
FIG. 3 is a flow chart illustrating a method for synthesizing sound relative to background noise conditions, according to one or more embodiments.

With reference to FIG. 3, a method for synthesizing sound relative to background noise conditions is illustrated according to one or more embodiments, and generally referenced by numeral 300. Generally, the method 300 adds a single gain block to augment a predetermined gain and spectral character of the SEN.

At step 310 the controller 116 receives input that is indicative of the microphone signal (MIC), vehicle speed (Vs) and music (AUDIO). In one or more embodiments, the controller 116 includes additional steps 320 and 330 to remove the effects of speech in the background noise estimate. For example, it may be undesirable for speech to trigger an increased level of SEN, in which case the speech could be eliminated from the MIC signal. At step 320 the controller 116 evaluates the microphone signal using a Voice Activity Detector (VAD) to determine if the background noise signal includes speech. In an embodiment, the controller 116 uses the VAD to analyze the temporal portions of the microphone signal (MIC) that do not contain speech to determine the background noise level and spectral content. Alternatively, if the controller 116 identifies speech within the microphone signal, it proceeds to step 330, removes the speech, and then proceeds to step 340. If the controller 116 does not identify speech at step 320, it proceeds to step 340. In an alternate embodiment (not shown), if speech is detected at 320, the controller 116 ignores frames with speech and returns to step 310 to receive and re-analyze a new MIC signal.

At step 340 the controller 116 processes the MIC signal to remove music and SEN. As described above, the controller 116 removes a majority of the music signal and SEN from the microphone signals (MIC), using an electrical or acoustic noise suppression technique, to produce a de-noised signal (MIC_PROC), from which the in-cabin noise level may be derived. The controller 116 may omit the music removal portion of this step, if no music is playing in the cabin.

At step 350, the controller 116 determines a gain setting (GAIN) of the Additional Gain Block (AGB) 140 based on the processed microphone signal (MIC_PROC). In one or more embodiments, the controller 116 determines an in-cabin noise level (ICNL) based on the processed microphone signal (MIC_PROC). The controller 116 also determines a lookup table level (LTL) based on the current vehicle speed (VS) using predetermined data, e.g., a lookup table, of typical background noise level versus vehicle speed. The controller 116 then determines the GAIN based on the difference of the ICNL and LTL for the current vehicle speed (VS). For example, in one or more embodiments, the ICNL is 1 dB lower than the LTL, and the controller 116 determines a value of the AGB to be −1 dB. The controller 116 may apply temporal smoothing to the MIC signal or on the ICNL, to create a more accurate and stable estimate of the perceived background noise level in the passenger compartment 122. In other embodiments, the controller 116 uses nonlinear scale factors for translating the difference between the LTL value and the ICNL signal level into a GAIN. At step 360 the controller 116 applies the new GAIN to the AGB 140, and then returns to step 310.

Figure 4:
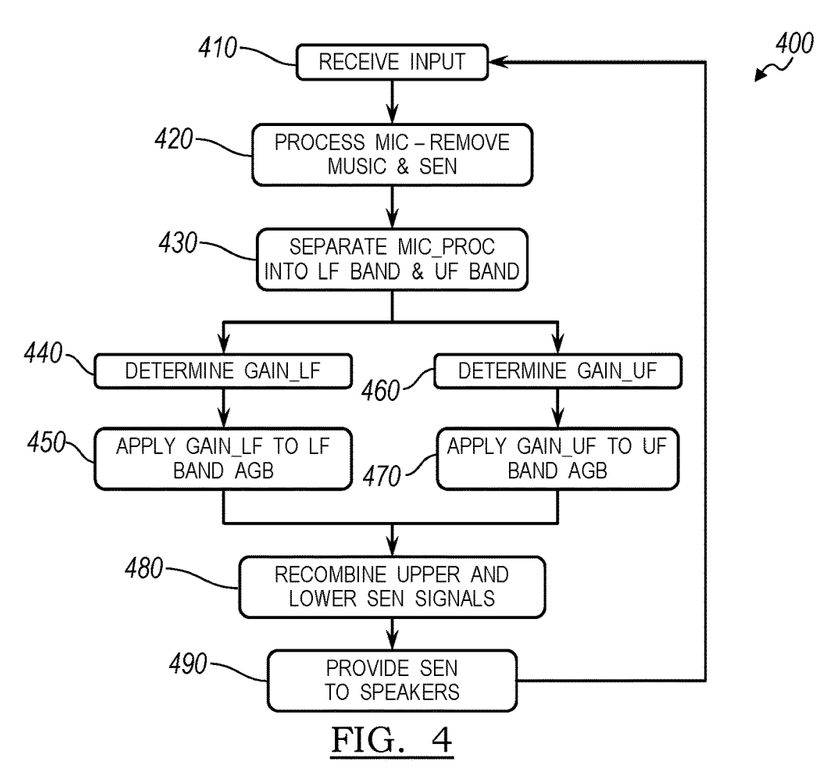
FIG. 4 is a flow chart illustrating another method for synthesizing sound relative to background noise conditions, according to one or more embodiments.

With reference to FIG. 4, a method for synthesizing sound relative to background noise conditions is illustrated according to one or more embodiments, and generally referenced by numeral 400. Generally, the method 400 adds two gain blocks, for two different frequency bands, to augment a predetermined gain and spectral character of the SEN differently based on frequency.

At step 410 the controller 116 receives input that is indicative of the microphone signal (MIC), vehicle speed (Vs) and music (AUDIO). At step 420 the controller 116 processes the MIC signal to remove music and SEN. As described above, the controller 116 removes the majority of the SEN, and optionally music and/or speech, from the microphones 120, using any electrical or acoustic noise suppression technique, to produce a MIC_PROC signal that is related to the in-cabin noise level.

At step 430, the controller 116 separates the processed microphone signal (MIC_PROC) into two different frequency bands: a low frequency (LF) band and an upper frequency (UF) band. In one or more embodiments the bandwidth for the LF band is approximately 20-200 Hz, and the bandwidth for the HF band is approximately 200 Hz-20 kHz. For this embodiment, the Additional Gain Block (AGB) 140 illustrated in FIG. 2, includes an LF band AGB and a UF band AGB. In other embodiments, the controller 116 separates the processed microphone signal (MIC_PROC) into more than two different frequency bands, e.g., three frequency bands including: a low frequency (LF) band, a medium frequency (MF) band, and an upper frequency (UF) band. In one or more embodiments the bandwidth for the LF band is approximately 20-200 Hz, the bandwidth for the MF band is approximately 200 Hz-2 kHz, and the bandwidth for the HF band is approximately 2 kHz-20 kHz.

At step 440, the controller 116 determines a gain setting (GAIN_LF) of the LF band AGB based on the low frequency band of the processed microphone signal (MIC_PROC_LF) and the predetermined LTL for the low frequency band. In one or more embodiments, the controller 116 determines an in-cabin noise level (ICNL_LF) based on the low frequency band of the processed microphone signal (MIC_PROC_LF). The controller 116 also determines the GAIN_LF based on the predetermined low frequency lookup table level (LTL_LF) value at the current vehicle speed (VS) and the ICNL_LF. The controller 116 then determines the GAIN_LF based on the difference of the ICNL_LF and LTL_LF for the current vehicle speed (VS). At step 450 the controller 116 applies the new GAIN_LF to the LF band AGB 140 to generate an adjusted (i.e., attenuated or amplified) low frequency (LF) SEN Signal.

At step 460, the controller 116 determines a gain setting (GAIN_UF) of the UF band AGB based on the upper frequency band of the processed microphone signal (MIC_PROC_UF) and the predetermined LTL for the upper frequency band. In one or more embodiments, the controller 116 determines an in-cabin noise level (ICNL_UF) based on the upper frequency band of the processed microphone signal (MIC_PROC_UF). The controller 116 also determines the GAIN_UF based on the predetermined upper frequency lookup table level (LTL_UF) value at the current vehicle speed (VS) and the ICNL_UF. The controller 116 then determines the GAIN_UF based on the difference of the ICNL_UF and LTL_UF for the current vehicle speed (VS). At step 470 the controller 116 applies the new GAIN_UF to the UF band AGB 140 to generate an adjusted (i.e., attenuated or amplified) high frequency (HF) SEN Signal.

In one or more embodiments, the controller 116 increases the level of the LF Band Gain more than the UF Band Gain at higher background noise levels because the spectrum of most in-vehicle noise is low frequency dominant. For example, in one or more embodiments, the ICNL_LF is 3 dB higher than the LTL_LF, therefore the controller 116 determines a value of the LF band AGB to be 3 dB; and the ICNL_UF is 1 dB higher than the LTL_UF, and the controller 116 determines a value of the LF band AGB to be 1 dB.

After steps 450 and 470, the controller 116 proceeds to step 480 and recombines the LF SEN Signal and the UF SEN Signal. At step 490, the vehicle system 110 provides the combined SEN Signal to the loudspeakers 118 to play sound within the passenger compartment 122.

Figure 5:
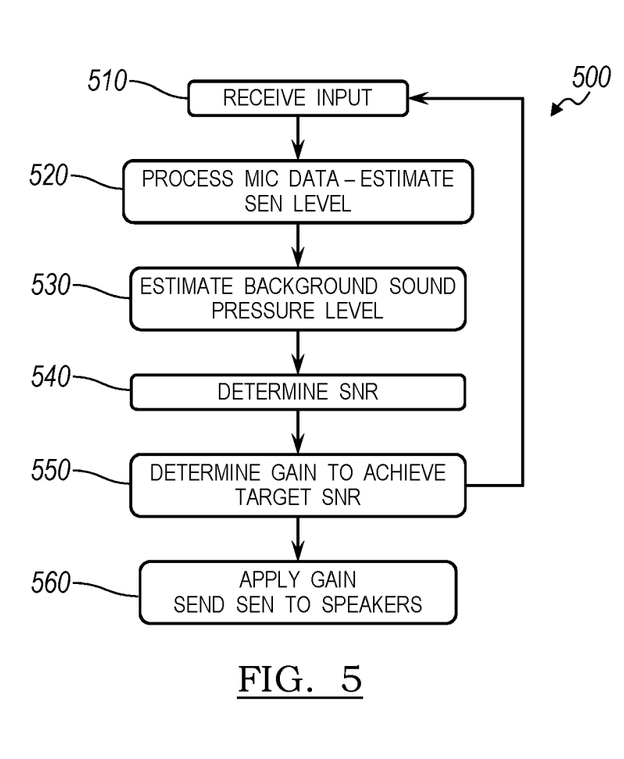
FIG. 5 is a flow chart illustrating yet another method for synthesizing sound relative to background noise conditions, according to one or more embodiments.

With reference to FIG. 5, another method for synthesizing sound relative to background noise conditions is illustrated according to one or more embodiments, and generally referenced by numeral 500. Generally, the method 500 determines the appropriate synthesized engine noise (SEN) level in the vehicle to achieve a target signal to noise ratio (SNR) of SEN relative to the background noise level.

At step 510 the controller 116 receives input that is indicative of the microphone signal (MIC). At step 520 the controller 116 processes the MIC signal to estimate the SEN by adaptively reducing or removing music, passenger noises, road noise, etc. At step 530, the controller 116 estimates the background sound pressure level signal by adaptively reducing or removing the SEN signal, from the MIC signal. In one or more embodiments, the controller 116 also adaptively removes the music signal, and any speech signals. Then at step 540 the controller 116 determines the signal to noise ratio (SNR) using the SEN estimate as the signal and the background sound pressure level signal as the noise.

At step 550 the controller 116 determines a GAIN to be applied to the Additional Gain Block (AGB) 140 to achieve a Target SNR. In one or more embodiments, the Target SNR may be as high as −4 dB SNR, and may be achievable by using one analysis band, or more bands. It may be desirable to achieve a target SNR in each of two bands, from 20-200 Hz and 200 Hz-20 kHz. It may be desirable to achieve different target SNR's in each of the two bands. It may be desirable to achieve this SNR in each of three bands, from 20-200 Hz, 200 Hz-2 kHz, and 2-20 kHz. At step 560 the controller applies the GAIN and provides the adjusted SEN Signal to the loudspeakers 118 to play within the passenger compartment 122. Other embodiments of the method 500, contemplate different target SNRs, different frequency ranges, and/or additional frequency bands.

Figure 6:
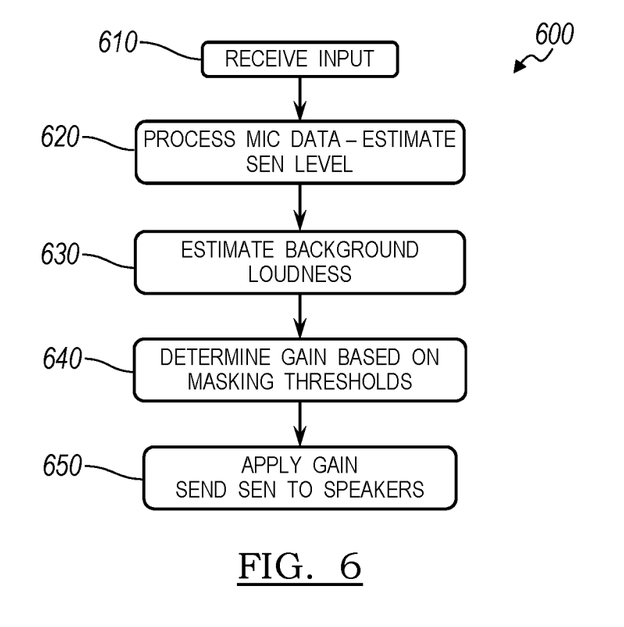
FIG. 6 is a flow chart illustrating still yet another method for synthesizing sound relative to background noise conditions, according to one or more embodiments.

With reference to FIG. 6, a method for synthesizing sound relative to background noise conditions is illustrated according to one or more embodiments, and generally referenced by numeral 600. Generally, the method 600 determines the appropriate synthesized engine noise (SEN) level in the vehicle to maintain a generally constant perceived loudness of the SEN. The Fletcher-Munson equal loudness curves show that a constant perceived loudness level is not a constant Sound Pressure Level (SPL) as a function of frequency. They also illustrate how the human ear has a non-uniform sensitivity to low frequencies at low playback levels relative to medium and high sound pressure levels. Because the MIC measures sound pressure and not perceived loudness, the Fletcher-Munson curves may be used to determine the appropriate frequency dependent gain to apply, especially to the bass region, below 200 Hz. In an embodiment, the SEN signal is processed by a difference curve that is created by subtracting the appropriate level Fletcher-Munson curve from a frequency independent level. This approach will ensure the perceived frequency-dependent character of the SEN will not change as its playback level or changes.

SEN containing synthesized engine orders contains sinusoidal tones. Broadband noises may partially or completely mask sinusoidal tones, rendering them less audible or inaudible. Tones below 500 Hz have masking thresholds that are flat with frequency, but above 500 Hz, the masking thresholds increase with increasing frequency. SEN may contain synthesized engine orders as high as 1500 Hz. In certain embodiments, the level of SEN optionally containing synthesized engine orders, may be single or multi-band filtered with a gain appropriate to maintain audibility of one or more synthesized engine orders. In an embodiment, a single or multi-band gain may be applied to remove or reduce the broadband background noise's masking effect on any portion of the SEN.

At step 610 the controller 116 receives input that is indicative of the microphone signal (MIC). At step 620 the controller 116 processes the MIC signal to estimate the SEN by adaptively removing music, passenger noises, road noise, etc. At step 630, the controller 116 estimates the background sound pressure level by adaptively removing the SEN signal from the MIC signals. In one or more embodiments, the controller 116 also adaptively removes the music signal. Then at step 640 the controller 116 determines a GAIN, or multi-band GAINs, to be applied to the Additional Gain Block (AGB) 140 based on masking thresholds and/or by applying filters derived from the Fletcher-Munson curves. At step 650 the controller applies the GAIN and provides the adjusted SEN Signal to the loudspeakers 118 to play within the passenger compartment 122.

As described previously, the vehicle system 110 may include multiple microphones 120 and/or multiple frequency bands. Although this technique is readily expandable to involve multiple microphones 120. It is likely most useful to locate the microphones 120 near to the passenger's ears, as they will then provide a MIC signal that is most representative of the noise field experienced by the passengers. This aforementioned location is not necessary though. Further, it is possible and may be useful to combine multiple processed MIC signals into one background noise level estimate. Maintaining separate MIC signals is useful in certain embodiments though. This is because certain in-cabin speaker systems allow essentially independent regions of sound, and therefore the ICN level at the location of each passenger's ears may be independently and optimally computed and the AGB's gain may be computed to optimize the SEN level for each passenger independently.

As mentioned above, the SEN may be separated into multiple frequency bands, and may pass through separate SEN AGB's for each band, before being recombined into a single SEN signal. In these multiple frequency band embodiments, two frequency bands and three frequency bands may be the most useful, though higher numbers of bands are possible. In addition, multiple alternate and somewhat equivalent Digital Signal Processing (DSP) filtering techniques are possible to implement. That is, it may be desirable to implement a 6 dB low frequency shelf filter to increase the level of a portion of the frequency band, instead of applying a frequency independent gain to an entire frequency band. Alternate techniques, including applying IIR biquad filters, FIR filters, etc to augment the spectral shape or level of the SEN to achieve the desired SEN level are possible and are within the scope of this invention, additionally, analog filtering is possible.

It may be advantageous to use a maximum rate of change time constant to changes in the AGB, rather than applying these changes after every block of microphone data has been processed. It may be desirable to implement a different rate of change for increasing the level than for decreasing the level. It may be advantageous to average the ICNL and/or the MIC_PROC or other time domain signals or level measuring signals to achieve an average level.

The SEN level may also be adjusted using advanced human interface devices. For example, mobile phone handsets have had "always-on, always-listening" technology for more than 5 years. These devices are always listening for key words, and when detected, they will initiate the beginning of an instruction or algorithm. An algorithm always listening for key words indicating that the vehicle's synthetic engine sound is simply too loud may be incorporated into a vehicle. This algorithm may be used to adaptively lower, or even completely eliminate the level of SEN played back through the speakers. Similarly, facial recognition systems that detect emotional state or user dissatisfaction with the current level of SEN are possible and may be used as guiding signals to reduce the amplitude of or even eliminate the SEN playback.

Although in the embodiments described above, the gain of the SEN is adjusted in a specific gain adjusting block (i.e., AGB 140), it is understood that the gain of the SEN may be adjusted in other blocks, or other processors. Further, other alternate digital or analog signal processing methods may be employed to adjust the level of the SEN. For example, high or low frequency shelves may be employed, as can various analog, FIR or IIR filters that may add or remove energy from particular frequency bands of the SEN to reduce its perceived level in the vehicle. Any or combinations of any of the aforementioned methods, or other methods known to those skilled in the art, may be employed to increase or reduce the sound pressure level, loudness or perceived loudness of the SEN.

In embodiments above and in FIG. 2, multiple methods of SEN synthesis are described. Alternate methods and alternate methods using alternate signal processing blocks are possible to implement. The disclosed methods of increasing or reducing the level of the SEN relative to background noise may be employed with these alternate methods, and with combinations of multiple or alternate methods.

While exemplary embodiments are described above, it is not intended that these embodiments describe all possible forms. Rather, the words used in the specification are words of description rather than limitation, and it is understood that various changes may be made without departing from the spirit and scope of the disclosure. Additionally, the features of various implementing embodiments may be combined to form further embodiments.

What is claimed is:

1. A vehicle sound synthesis system comprising:
   a loudspeaker adapted to project sound indicative of synthesized engine noise (SEN) within a cabin of a vehicle in response to receiving an adjusted SEN signal;
   a microphone disposed in the cabin and adapted to provide a microphone signal having a SEN component and a noise component; and
   a controller programmed to:
   receive the microphone signal;
   process the microphone signal to remove the SEN component;
   adjust a SEN signal based on the processed microphone signal; and
   provide the adjusted SEN signal to the loudspeaker.

2. The vehicle sound synthesis system of claim 1, wherein the controller is further programmed to:
   receive input indicative of a vehicle speed;
   determine a cabin noise level based on the noise component of the microphone signal;

determine a target sound level based on the vehicle speed; and determine a gain based on a difference between the cabin noise level and the target sound level; and adjust the SEN signal based on the gain.

3. The vehicle sound synthesis system of claim 1, wherein the noise component comprises a speech component indicative of speech present in the cabin, and wherein the controller is further programmed to:

process the microphone signal to remove the speech component using a voice activity detector (VAD) technique; and adjust the SEN signal based on the processed microphone signal.

4. The vehicle sound synthesis system of claim 1, wherein the noise component comprises a music component indicative of music present in the cabin, and wherein the controller is further programmed to:

process the microphone signal to remove the music component; and adjust the SEN signal based on the processed microphone signal.

5. The vehicle sound synthesis system of claim 1, wherein the controller is further programmed to generate the SEN signal based on at least one of a signal to noise ratio (SNR) and a sound pressure level (SPL) present in the cabin while an engine is operating, and during a state when the vehicle is powered on and the engine is stopped.

6. The vehicle sound synthesis system of claim 1, wherein the microphone signal comprises a first frequency microphone signal corresponding to a first frequency band, and a second frequency microphone signal corresponding to a second frequency band that is different than the first frequency band, and wherein the controller is further programmed to:

separate the SEN signal into a first frequency SEN signal corresponding to the first frequency band, and a second frequency SEN signal corresponding to the second frequency band;

adjust the first frequency SEN signal by a first gain;

adjust the second frequency SEN signal by a second gain; and generate the adjusted SEN signal based on a combination of the adjusted first frequency SEN signal and the adjusted second frequency SEN signal.

7. The vehicle sound synthesis system of claim 6, wherein the first frequency band is lower than the second frequency band, and wherein the first gain is greater than the second gain.

8. The vehicle sound synthesis system of claim 1, wherein the microphone signal comprises a first frequency microphone signal corresponding to a first frequency band, a second frequency microphone signal corresponding to a second frequency band, and a third frequency microphone signal corresponding to a third frequency band, and wherein the controller is further programmed to:

separate the SEN signal into a first frequency SEN signal corresponding to the first frequency band, a second frequency SEN signal corresponding to the second frequency band, and a third frequency SEN signal corresponding to the third frequency band;

adjust the first frequency SEN signal by a first gain;

adjust the second frequency SEN signal by a second gain;

adjust the third frequency SEN signal by a third gain; and generate the adjusted SEN signal based on a combination of the adjusted first frequency SEN signal, the adjusted second frequency SEN signal, and the adjusted third frequency SEN signal.

9. The vehicle sound synthesis system of claim 1, wherein the controller is further programmed to:

receive input indicative of a vehicle speed;

determine a background sound pressure level based on the microphone signal;

determine a ratio of the SEN signal to the background sound pressure level that is indicative of a signal to noise ratio (SNR);

determine a target SNR based on the vehicle speed;

determine a gain based on a difference between the SNR and the target SNR; and adjust the SEN signal based on the gain.

10. The vehicle sound synthesis system of claim 1, wherein the controller is further programmed to:

determine a background loudness based on the microphone signal;

determine a gain based on the background loudness and at least one predetermined Fletcher-Munson curve; and adjust the SEN signal based on the gain.

11. A vehicle system comprising:

a controller configured to:

receive a microphone signal from a microphone that corresponds to sound and noise present within a vehicle cabin;

process the microphone signal;

generate a SEN signal indicative of synthesized engine noise (SEN) based on at least one of a signal to noise ratio (SNR) and a sound pressure level (SPL) present in the cabin while an engine is operating, and during a state when the vehicle is powered on and the engine is stopped;

adjust the SEN signal based on the processed microphone signal; and provide the adjusted SEN signal to a loudspeaker for projecting as the sound present within the vehicle cabin.

12. The vehicle system of claim 11, wherein the controller is further configured to:

receive an input indicative of a vehicle speed;

determine a cabin noise level based on the processed microphone signal;

determine a target sound level based on the vehicle speed; and determine a gain based on a difference between the cabin noise level and the target sound level; and adjust the SEN signal based on the gain.

13. The vehicle system of claim 11, wherein the controller is further configured to:

separate the processed microphone signal into a first frequency processed microphone signal corresponding to a first frequency band, and a second frequency processed microphone signal corresponding to a second frequency band that is greater than the first frequency band;

separate the SEN signal into a first frequency SEN signal corresponding to the first frequency band, and a second frequency SEN signal corresponding to the second frequency band;

adjust the first frequency SEN signal by a first gain;

adjust the second frequency SEN signal by a second gain, wherein the second gain is lower than the first gain; and generate the adjusted SEN signal based on a combination of the adjusted first frequency SEN signal and the adjusted second frequency SEN signal.

14. The vehicle system of claim 11, wherein the controller is further programmed to:
process the microphone signal to remove noise indicative of music; and
adjust the SEN signal based on the processed microphone signal.

15. An audio system comprising:
the vehicle system according to claim 11;
the loudspeaker adapted to project the sound indicative of the SEN within the vehicle cabin in response to receiving the adjusted SEN signal; and
the microphone adapted to provide the microphone signal indicative of the sound projected by the loudspeaker and noise present within the vehicle cabin.

16. A computer-program product embodied in a non-transitory computer readable medium that is programmed for synthesizing engine noise (SEN), the computer-program product comprising instructions for:
receiving a microphone signal indicative of sound and noise present within a vehicle cabin, and input indicative of a vehicle speed;
processing the microphone signal;
generating a SEN signal indicative of SEN based on the vehicle speed;
determining a background sound pressure level based on the processed microphone signal;
determining a ratio of the SEN signal to the background sound pressure level that is indicative of a signal to noise ratio (SNR);
determining a target SNR based on the vehicle speed;
determining a gain based on a difference between the SNR and the target SNR;
adjusting the SEN signal based on the processed microphone signal and the gain; and
providing the adjusted SEN signal to a loudspeaker for projecting the sound within the vehicle cabin.

17. The computer-program product of claim 16, further comprising instructions for:
processing the microphone signal to remove noise indicative of speech; and
removing the noise indicative of speech using a voice activity detector (VAD) technique.

18. The computer-program product of claim 16, further comprising instructions for:
determining a background loudness based on the processed microphone signal;
determining a gain based on the background loudness and at least one predetermined Fletcher-Munson curve; and
adjusting the SEN signal based on the gain.

* * * * *